United States Patent [19]

Kawakubo et al.

[11] Patent Number: 4,687,818
[45] Date of Patent: Aug. 18, 1987

[54] POLYMER AND PRESSURE SENSITIVE ADHESIVE COMPOSITION

[75] Inventors: Fumio Kawakubo; Miyako Takanoo, both of Kobe; Sadao Yukimoto, Akashi; Katsuhiko Isayama, Kobe, all of Japan

[73] Assignee: Kanegafuchi Kagaku Kogyo Kabushiki Kaisha, Osaka, Japan

[21] Appl. No.: 759,877

[22] Filed: Jul. 29, 1985

Related U.S. Application Data

[63] Continuation of Ser. No. 545,645, Oct. 26, 1983, abandoned.

[30] Foreign Application Priority Data

Oct. 27, 1982 [JP] Japan .................................. 57-189432

[51] Int. Cl.$^4$ ............................................. C08L 71/02
[52] U.S. Cl. ..................................... 525/404; 524/270; 525/403; 525/479; 526/279; 526/333; 528/26; 528/32
[58] Field of Search ....................... 525/404, 479, 403; 526/333, 279; 528/26

[56] References Cited

U.S. PATENT DOCUMENTS

| | | | |
|---|---|---|---|
| 3,951,888 | 4/1976 | Isayama et al. | 525/404 |
| 4,302,571 | 11/1981 | Arai et al. | 525/404 |
| 4,528,334 | 7/1985 | Knopf et al. | 525/404 |

*Primary Examiner*—Wilbert J. Briggs, Sr.
*Attorney, Agent, or Firm*—Antonelli, Terry & Wands

[57] ABSTRACT

A novel moisture-curable polymer useful as a pressure sensitive adhesive, a paint, a sealant, etc. obtained by polymerizing a polymerizable monomer in the presence of an organic polymer having at least one reactive silicon-containing functional group in the molecule on the average. A pressure sensitive adhesive composition having excellent adhesive property as well as excellent initial tackiness, heat resistance, workability and weather resistance comprising a polymer obtained by polymerizing a polymerizable monomer in the presence of (A) an organic polymer having at least one reactive silicon functional group in the molecule on the average and/or (B) an organic polymer having at least one olefin group in the molecule on the average. The composition is also useful as a sealant, a coating material, a packing, an electric insulation, a corrosionproof, a masking and a surface-protection.

9 Claims, No Drawings

4,687,818

POLYMER AND PRESSURE SENSITIVE ADHESIVE COMPOSITION

This is a continuation of application Ser. No. 545,645, filed Oct. 26, 1983, now abandoned.

BACKGROUND OF THE INVENTION

The present invention relates to a novel polymer curable by moisture to convert into an elastomeric material or a resinous material, and a pressure sensitive adhesive composition.

Organic polymers having in the molecule at least one reactive silicon functional group are obtained according to the process proposed, for instance, in Japanese Examined Patent Publication (Tokkyo Kokoku) No. 36319/1970, No. 12154/1971 and No. 32673/1974 and Japanese Unexamined Patent Publication (Tokkyo Kokai) No. 156599/1975, No. 73561/1976 and No. 6096/1979, and some of them are commercially available from Kanegafuchi Kagaku Kogyo Kabushikikaisha under the commercial name of "Kaneka MS Polymer". It is known that these organic polymers are curable by moisture and suitable for use in paints, adhesives, sealants, etc. However, these organic polymers have drawbacks resulting from the structure of the main chain and from the manner of bonding of the reactive silicon functional group to the main chain. For instance, the polymer proposed in Japanese Unexamined Patent Publication No. 73561/1976 is poor in weather resistance because it has urethane bonds in the main chains and the chain ends and also has a problem in workability because of a very high viscosity resulting from hydrogen bonds by urethane bonds. The polymer proposed in Japanese Unexamined Patent Publication No. 156599/1975 has a problem in weather resistance resulting from hydrogen atoms bonding to tertiary carbon atoms of the polyether main chain.

Conventional pressure sensitive adhesives are classified roughly into rubber adhesives, acrylic resin adhesives, silicone adhesives, and the like. The rubber adhesives are superior in tack (initial tackiness), but poor in weather resistance and heat resistance. On the other hand, the acrylic resin adhesives are superior in weather resistance and heat resistance, but poor in initial tackiness.

The silicone adhesives have less drawbacks than the rubber or acrylic resin adhesives and are superior in performance, but the use of them are limited because of their high price. For the purpose of eliminating the above-mentioned drawbacks, there is proposed a pressure sensitive adhesive composition containing a natural or synthetic rubber onto which a polymerizable monomer such as an acrylate or styrene monomer is graft-polymerized, but this purpose is not attained sufficiently. Conventional rubber adhesives have a problem in environmental sanitation or safety because the adhesives require a large amount of solvent as well as the acrylic resin adhesives, and further these adhesives are prepared by a complicated mechanical process such as a mastication.

It is an object of the present invention to provide a novel moisture-curable polymer having excellent weather resistance.

A further object of the invention is to provide a cheap pressure sensitive adhesive composition which scarcely requires solvent for dilution and which contains a polymerized product curable to convert into a rubber-like material or a resinous material having excellent inital tackiness, heat resistance and weather resistance.

These and other objects of the present invention will become apparent from the description hereinafter.

SUMMARY OF THE INVENTION

In accordance with the present invention, there is provided a moisture-curable polymer obtained by polymerizing a polymerizable monomer in the presence of an organic polymer having at least one reactive silicon functional group in the molecule on the average.

In accordance with the present invention, there is also provided a pressure sensitive adhesive composition comprising a polymer obtained by polymerizing a polymerizable monomer in the presence of (A) an organic polymer having at least one reactive silicon functional group in the molecule on the average and/or (B) an organic polymer having at least one olefin group in the molecule on the average.

DETAILED DESCRIPTION

It is necessary to employ an organic polymer having at least one reactive silicon functional group in the molecule on the average. Such polymers may be obtained according to the process proposed, for instance, in Japanese Examined Patent Publication No. 36319/1970, No. 12154/1971 and No. 32673/1974 and Japanese Unexamined Patent Publication No. 156599/1975, No. 73561/1976 and No. 6096/1979.

The organic polymer usable in the present invention has preferably a molecular weight of 300 to 30,000 and has a main chain consisting essentially of polyether, polyester, or ether-ester block copolymer. More preferably, the main chain of the organic polymer contains a polyether in an amount of over 30% by weight and other polymer such as vinyl polymer. Especially, the organic polymer is preferably a polyether, the main chain of which consists essentially of recurring units of the general formula: $-R^1O-$ wherein $R^1$ is a bivalent hydrocarbon group having 1 to 8 carbon atoms, preferably $R^1$ is a bivalent hydrocarbon group having 1 to 4 carbon atoms for the most part when taken a serious view of elasticity.

Typical examples of such a bivalent hydrocarbon group $R^1$ are, for instance, $-CH_2-$, $-CH_2CH_2-$, $-CH(CH_3)-CH_2-$, $-CH_2CH_2CH_2CH_2-$, $-CH(C_6H_5)-CH_2-$, $-CH(OCH_2CH=CH_2)-CH_2-$, and the like. The $-CH(CH_3)-CH_2-$ group is particularly preferred as the group $R^1$. The polyether may contain one or more kinds of the reccuring unit $-R^1O-$. The molecular weight of such a polyether is usually selected from 500 to 30,000. When the molecular weight is below 500, cohesion ability is lowered. On the other hand, when the molecular weight is over 30,000, the curable polymer which is obtained is apt to be poor in low-temperature resistance and to has less elasticity.

The above-mentioned organic polymer may be employed alone or in admixture thereof. A mixture containing at least 50% by weight of these organic polymers may also be employed.

The term "reactive silicon functional group" as used herein means a silicon-containing group capable of condensing or reacting by moisture or an additive, such as a hydrolyzable group bonding to silicon atom or silanol group. Representative examples of the reactive silicon functional group are, for instance, a group of the general formula (1):

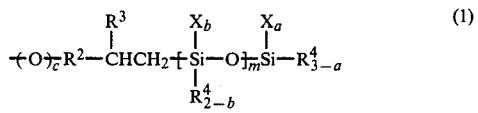

wherein $R^2$ is a bivalent organic group having 1 to 20 carbon atoms, $R^3$ is hydrogen or a monovalent organic group having 1 to 20 carbon atoms, $R^4$ is a monovalent hydrocarbon group or a triorganosiloxy group, "a" is 0, 1, 2 or 3, "b" is 0, 1 or 2, "c" is 0 or 1, provided $1 \leq a+b \leq 4$, X is silanol group or a hydrolyzable group, and m is 0 or an integer of 1 to 18.

The polyether having such a silicon functional group can be prepared, for instance, by addition reaction of a silicon hydride compound of the general formula (2):

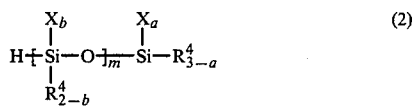

wherein $R^4$, X, a, b and m are as defined above, and a polyether having an olefin group of the general formula (3):

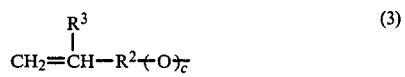

wherein $R^2$, $R^3$ and c are as defined above, in the presence of a platinum compound as a catalyst, such as platinum black, chloroplatinic acid, a platinum alcohol compound, a platinum olefin complex, a platinum aldehyde complex or a platinum ketone complex.

In the above formula (1) or (2), $R^4$ is a monovalent hydrocarbon group, especially a monovalent hydrocarbon group having 1 to 20 carbon atoms, e.g. an alkyl group such as methyl or ethyl group, a cycloalkyl group such as cyclohexyl group, an aryl group such as phenyl group, and an aralkyl group such as benzyl group, and also includes a triorganosiloxy group of the general formula: $(R')_3SiO$— wherein $R'$ is a monovalent hydrocarbon group having 1 to 20 carbon atoms and the groups $R'$ may be the same or different. The hydrocarbon groups $R^4$ contained in the silicon hydride compound (2) may be the same or different. Also, the group X in the above formula (1) or (2) is silanol group or a hydrolyzable group such as a halogen, hydrogen, an alkoxyl group, an acyloxy group, a ketoxymate group, amino group, amido group, aminoxy group, mercapto group and an alkenyloxy group. The hydrolyzable groups contained in the silicon hydride compound (2) may be the same or different.

Typical examples of the silicon hydride compound (2) are, for instance, a halogenated silane such as trichlorosilane, methydichlorosilane, dimethylchlorosilane or trimethylsiloxydichlorosilane; an alkoxysilane such as trimethoxysilane, triethoxysilane, methyldimethoxysilane, phenyldimethoxysilane or 1,3,3,5,5,7,7-heptamethyl-1,1-dimethoxytetrasiloxane; an acyloxysilane such as methyldiacetoxysilane or trimethylsiloxymethylacetoxysilane; a ketoxymatesilane such as bis(dimethylketoxymate)methylsilane or bis(cyclohexylketoxymate)methylsilane or bis(diethylketoxymate)trimethylsiloxysilane; a hydrosilane such as dimethylsilane, trimethylsiloxymethylsilane or 1,1-dimethyl-2,2-dimethyldisiloxane; an alkenyloxysilane such as methyltri(isopropenyloxy)silane, and the like. The silicon hydride compounds usable in the invention are not limited to the exemplified compounds.

In the preparation of the polyether having a reactive silicon functional group by the process mentioned above, after reacting the silicon hydride compound (2) and the polyether having the olefin group (3), a part or all of the groups X can be further converted into other hydrolyzable groups or hydroxyl groups. For instance, in the case when the group X is a halogen atom or hydrogen atom, it is rather preferable for use to convert X into an alkoxyl group, an acyloxy group, aminoxy group, an alkenyloxy group or hydroxyl group.

In the above formula (1) or (3), $R^3$ is hydrogen atom or a monovalent organic group having 1 to 20 carbon atoms, preferably hydrogen atom or a hydrocarbon group having 1 to 20 carbon atoms, more preferably hydrogen atom. Also, the group $R^2$ which is a bivalent organic group having 1 to 20 carbon atoms, is preferably a hydrocarbon group or a hydrocarbon group containing ether bond, ester bond, urethane bond or carbonate bond, and in particular, methylene group is preferred.

The polymerizable monomer usable in the present invention is at least one member selected from the group consisting of a vinyl monomer of the general formula (4):

wherein $R^5$ is hydrogen atom, a halogen atom or a substituted or unsubstituted monovalent aliphatic hydrocarbon group having 1 to 10 carbon atoms, and $R^6$ is hydrogen atom, a halogen atom, a substituted or unsubstituted monovalent aliphatic hydrocarbon group having 1 to 10 carbon atoms, a substituted or unsubstituted monovalent aromatic hydrocarbon group, an alkenyl group, carboxyl group, an acyloxy group, an alkoxycarbonyl group, nitrile group, pyridyl group, amido group or glycidoxy group, and a vinyl monomer of the general formula (5):

wherein $R^7$ is a monovalent hydrocarbon group having 1 to 10 carbon atoms selected from an alkyl group, an aryl group and an aralkyl group, $R^8$ is an organic residue having a polymerizable double bond, X is a hydrolyzable group and n is an integer of 1 to 3. The hydrolyzable group X is the same as defined above. The polymerizable monomers may be employed alone or in an admixture thereof.

A preferable vinyl monomer (4) is one having the general formula (6):

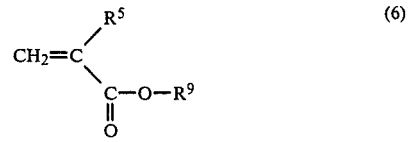

wherein $R^5$ is as defined above, and $R^9$ is a substituted or unsubstituted monovalent hydrocarbon group having 1 to 20 carbon atoms.

A preferable vinyl monomer (5) is one having the general formula (7):

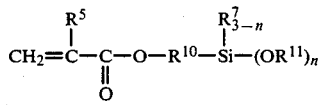
(7)

wherein $R^5$, $R^7$ and n are as defined above, $R^{10}$ is a bivalent hydrocarbon group having 1 to 10 carbon atoms, and $R^{11}$ is a substituted or unsubstituted monovalent hydrocarbon group having 1 to 8 carbon atoms.

Typical examples of the vinyl monomer (4) or (6) are, for instance, an acrylate or methacrylate such as methyl acrylate, methyl methacrylate, ethyl acrylate, ethyl methacrylate, butyl acrylate, isobutyl acrylate, butyl methacrylate, 2-ethylhexyl acrylate, 2-ethylhexyl methacrylate, benzyl acrylate, benzyl methacrylate or oligomers thereof (for example, the commercial name of "Aronix-5700" commercially available from Toa Gosei Kagaku Kogyo Kabushikikaisha), a carboxylic acid such as acrylic acid, methacrylic acid, itaconic acid or fumaric acid, an acid anhydride such as maleic anhydride; an epoxy compound such as glycidyl acrylate or glycidyl methacrylate; an amino compound such as diethylamino ethyl acrylate, diethylaminoethyl methacrylate or aminoethyl vinyl ether; an amide compound such as acrylamide, methacrylamide, itaconic diamide, α-ethylacrylamide, crotonamide, fumaric diamide, maleic diamide, N-butoxymethylacrylamide or N-butoxymethylmethacrylamide; a hydroxy group-containing vinyl compound such as 2-hydroxyethyl acrylate, 2-hydroxyethyl methacrylate, 2-hydroxypropyl acrylate, 2-hydroxypropyl methacrylate, 2-hydroxyvinyl ether or N-methylolacrylamide; acrylonitrile, styrene, α-methylstyrene, chlorostyrene, vinyl chloride, vinylidene chloride, vinyl acetate, vinyl propionate, vinylpyridine, butadiene, chloroprene, isobutylene, propylene, ethylene, and the like.

Typical examples of the vinyl monomer (5) or (7) are, for instance,

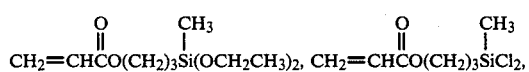

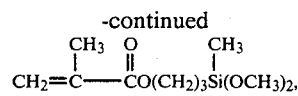

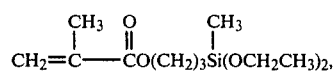

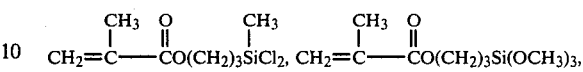

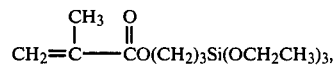

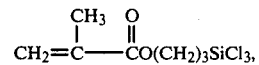

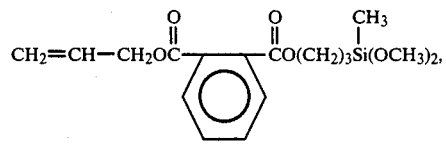

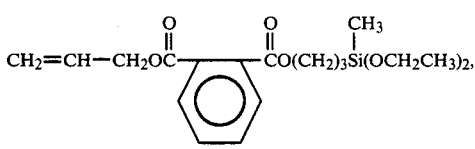

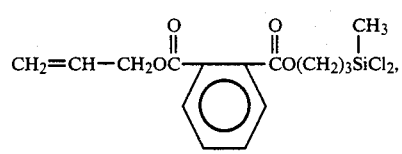

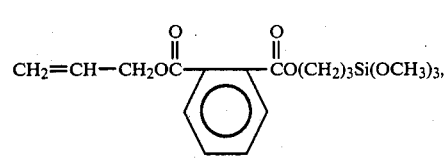

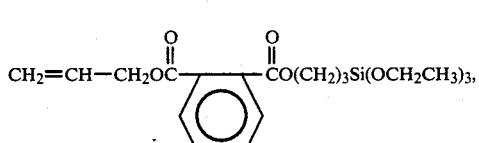

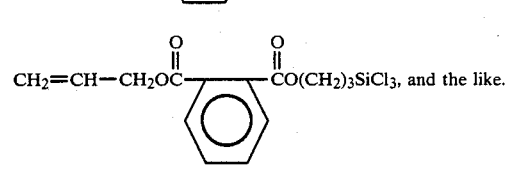

Particularly, $CH_2=C(CH_3)-CO_2(CH_2)_3Si(OCH_3)_3$ is preferable.

The polymerizable monomers used for the preparation of the moisture-curable polymer are suitably selected according to the purposes. For instance, in case that the improvement in the weather resistance of the organic polymer is desired, the use of the so-called acrylic monomer such as ethyl acrylate, iobutyl acrylate, methyl methacrylate or $CH_2=C(CH_3)CO_2(CH_2)_3Si(OCH_3)_3$ is preferable. Also, in case of improving the adhesive property, the use of acrylamide, an epoxy-containing vinyl monomer, 2-ethylhexyl acrylate or $CH_2=C(CH_3)-CO_2(CH_2)_3Si(OCH_3)_3$ is preferable.

The exemplified polymerizable monomers may be employed alone or in admixture thereof. The monomers may be used in an amount of 0.1 to 1000 parts, preferably 1 to 200 parts by weight per 100 parts by weight of the organic polymer. When the monomers are used in an amount of below 0.1 parts by weight, it is difficult to obtain a satisfactory effect in the improvement of product quality. On the other hand, when the monomers are used in an amount over 1000 parts by weight, the original properties of the organic polymer to be improved are destroyed.

The polymerization for preparing the moisture-curable polymer can be carried out by usual methods, for instance, a method using a radical polymerization initiator and a method utilizing irradiation of ultraviolet rays, X-rays. Particularly, the moisture-curable polymer of the present invention can be easily obtained by the process in which to the organic polymer are added the predetermined amount of the polymerizable monomer and a radical polymerization initiator, and the mixture is heated under a nitrogen stream with stirring, or by the process in which to the preheated organic polymer is added the predetermined amount of the polymerizable monomer containing a dissolved radical polymerization initiator dropwisely under a nitrogen stream with stirring. The radical initiators include, for instance, peroxides such as benzoyl peroxide, benzoyl hydroperoxide, di-t-butyl peroxide, di-t-butyl hydroperoxide, p-t-butyl perbenzoate, acetyl peroxide, lauroyl peroxide and hydrogen peroxide; azo compounds such as azobisisobutylonitrile; persulfates, peroxydicarbonates such as diisopropyl peroxydicarbonate; special radical polymerization initiators such as bis-azodicyano valeric acid, and the like. Also the compound having the reactive silicon functional group such as

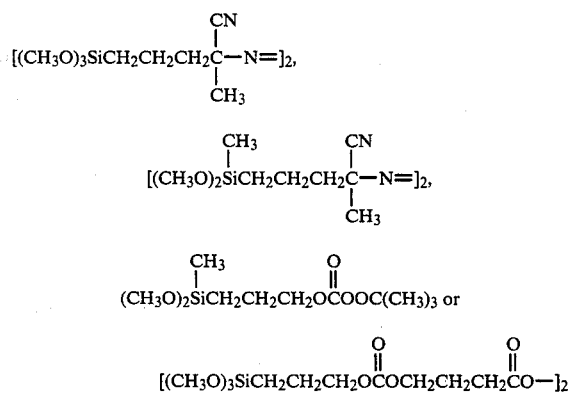

may be employed.

The radical initiators may be employed alone or in admixture thereof, in an amount of 0.5 to 10 parts by weight of the polymerizable monomer.

As occasion demands, it is possible to use a chain transfer agent for the purpose of adjusting the degree of polymerization. Typical examples of the chain transfer agent are, for instance, mercaptans such as lauryl mercaptan and dodecyl mercaptan; halogen-containing compounds, and the like. Also the compound having the reactive silicon functional group such as

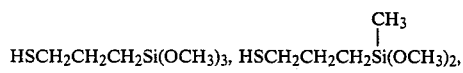

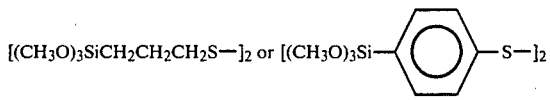

may be employed.

The chain transfer agents may be employed alone or in admixture thereof.

In the preparation of the moisture-curable polymer, a solvent may be employed, as occasion demands. Preferably the solvent is inert to both the organic polymer having the reactive silicon functional group and the vinyl monomer. Examples of the solvent are, for instance, hydrocarbones such as benzene, toluene, xylene, hexane, cyclohexane and methylethyl ketone; acetates such as ethyl acetate; ethers, and the like. However the polymerization reaction can be carried out without any solvents because the organic polymer, especially polyether, serves as solvent.

The polymerization temperature is not particularly limited. In case of carrying out the polymerization by means of a radical initiator, the optimum polymerization temperature is selected according to the kind of the initiator used, usually from 50° C. to 150° C.

The vinyl monomer to be polymerized may be introduced to a polymerization vessel all at once, or may be introduced intermittently or continuously for the purpose of controlling generation of heat, and the like.

The novel moisture-curable polymer of the present invention is suitable for use in an adhesive, a paint, a sealant a casting material or a molding material curable into a rubber-like material.

It has been further found that the polymerization product of the before-mentioned polymerizable monomer in the presence of an organic polymer having at least one olefin group in the molecule on the average is useful as an effective component of a pressure sensitive adhesive composition, as well as the above-mentioned polymerization product in the presence of the organic polymer having the reactive silicon functional group.

Thus, it is the second aspect of the present invention in which, a pressure sensitive adhesive composition comprising a polymer obtained by polymerizing a polymerizable monomer in the presence of (A) an organic polymer having at least one reactive silicon functional group in the molecule on the average and/or (B) an organic polymer having at least one olefin group in the molecule on the average.

The organic polymer (B) used in the present invention can be prepared, for instance, by a process as disclosed in present inventors' Japanese Unexamined Patent Publication No. 6097/1979, or by a process wherein an epoxy compound such as ethylene oxide or propylene oxide is copolymerized with an olefin-containing epoxy compound such as allyl glycidyl ether to introduce the olefin group into the side chain of the produced polyether.

Typical examples of the olefin group found in the organic polymer (B) are, for instance, $-OCH_2CH=CH_2$, $-OC(CH_3)=CH_2$, $-OCH_2CH_2CH=CH_2$,

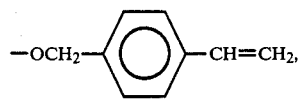

—OCOCH$_2$CH=CH$_2$, —OCOC(CH$_3$)=CH$_2$, and the like. The olefin groups and the reactive silicon functional groups may be present at the end or side chain of the polyether. It is preferable to employ the organic polymer (B), the main chain of which contains a polyether in an amount of over 30% by weight, having at least one olefin group in the molecule on the average from the viewpoint of the graft-polymerization reaction.

Also the use of the organic polymer having the reactive silicon functional group as well as the olefin group is useful since thermally stable cross-linkage is formed.

The polymerization of the polymerizable monomer (4) and/or monomer (5) in the presence of the organic polymer (B) can be made in the same manner as mentioned above. The monomer is used in an amount of 2 to 5000 parts by weight per 100 parts by weight of the organic polymer (B).

It is preferable to employ a monomer mixture containing at least 50% by mole of an alkyl acrylate with a C$_2$ to C$_{14}$ alkyl group, especially butyl acrylate and/or 2-ethylhexyl acrylate, from the viewpoint of the compatibility of the produced polymer with the polyether and the tackiness. The alkyl acrylate with a C$_2$ to C$_{14}$ alkyl group contributes to revelation of the tackiness as well as the polyether. In particular, the polymerizable silane compounds shown by the formula (5) (the polymerizable monomers having silicon functional group) and the vinyl monomers having a functional group such as acrylic acid, methacrylic acid and maleic anhydride have an effect of raising the cohesive force and the adhesive strength with the copolymerization thereof in a small amount.

The polymerization product preferably contains a functional group capable of cross-linking from the viewpoint of heat resistance and weather resistance. The functional group capable of cross-linking can be introduced into the polymerization product by employing the organic polymer of a vinyl monomer containing the functional group. For the purpose of introducing the functional group into the polymerization product, the organic polymer of a vinyl monomer is employed having the functional group such as carboxylic acid, acid ahhydride, epoxy group, amino group, amido group, hydroxy group or the reactive silicon functional group.

When the number of the reactive silicon functional groups is more than 50% of the total number of all the functional groups capable of cross-linking in the organic polymer or vinyl monomer to be polymerized, the polymerization product which is superior in both adhesive force and weather resistance is obtained.

In particular, the introduction of the polymerizable silane compound is preferable, since it can also form thermally stable siloxane cross-linkages by condensation with the reactive silicon functional group present in the polyether. In this case, the silane compound of the formula (5) is preferably used in an amount of 0.1 to 10% by mole of the total amount of the polymerizable monomers mixture.

The pressure sensitive adhesive composition of the present invention has a good adhesive property by itself but may contain various other additives, as occasion demands.

Examples of the additives are, for instance, curing catalyst such as a known silanol condensation catalyst, tackifier; age resister such as antioxidant or ultraviolet absorbent; filler or reinforcement such as white carbon, carbon black, calcium carbonate, titanium oxide, talc, rock wool or glass fiber, plasticizer; coloring agent, fire retardant; softener, and the like.

The composition may be blended with another compatible polymer.

Examples of the compatible polymer are, for instance, acrylic polymer, the main component of which is alkyl acrylate or methacrylate with C$_2$ to C$_{14}$ alkyl group; various polyether shown by the general formula (1) having the reactive silicon functional group disclosed in Japanese Examined Patent Publication No. 36319/1970, No. 12154/1971, No. 30711/1971 and No. 36960/1973 and Japanese Unexamined Patent Publication No. 73998/1977, and the like.

Examples of the curing catalyst are, for instance, metal carboxylate such as dibutyl tin dilaurate, tin dioctylate, dibutyl tin maleate or dioctyl tin laurate; reaction product of dialkyl tin oxide such as dibutyl tin oxide or dioctyl tin oxide with ester compound such as dioctyl phthalate or tetraethylorthosilicate; alkyl titanate; amines; acids; basic compound, and the like.

Examples of the tackifier are, for instance, known resin giving tackiness such as rosin, modified rosin, rosin ester, terpene resin, terpene-phenol resin, phenol resin or petroleum resin, and the like.

The pressure sensitive adhesive composition of the present invention can be modified not only by changing kinds, proportions and molecular weights of the polymerizable monomers or selecting the polymerization process, e.g. multistage-polymerization as in case of a conventional acrylic resin pressure sensitive cohesion composition, but also by changing a ratio of the polyether and the polymerizable monomer, a molecular weight and a degree of branching of the polyether, or kinds and numbers of the olefin group and the reactive silicon functional group or by employing the resin giving the tackiness as in case of a rubber pressure sensitive cohesion composition.

Accordingly, the composition is suitable for use not only in usual adhesive, sealant, coating material, especially in pressure sensitive adhesive, but also in packing, electric insulation, corrosion-proof, masking, surface-protection, etc.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLE 1

A nitrogen sealable reactor equipped with a condenser and a stirrer was charged with 100 g. of a polyether having silyl end groups and having a molecular weight of about 8,000, and the temperature was elevated to 130° C. under nitrogen atmosphere. To the reactor was added dropwise over about 1 hour 20 g. of a liquid consisting of 30 parts of styrene, 30 parts of methyl methacrylate, 10 parts of n-butyl acrylate, 30 parts of γ-methacryloyloxypropyltrimethoxysilane and 4 parts of azobisisobutyronitrile. The system became cloudy, but no separation was observed even if allowed to stand.

To 100 g. of the thus prepared polymer were added 3 g. of tin (II) octylate and 1 g. of laurylamine. After thoroughly admixing, the mixture was applied to an aluminum plate and cured at 50° C. and 50% RH for 2 days. After cooling to ordinary temperature, it was attempted to peel off the coating from the aluminum plate. It was not peeled off, but broken. With respect to the polyether, the peeling test was repeated. The polyether coating easily peeled off from the aluminum plate.

EXAMPLE 2

A nitrogen sealable reactor equipped with a condenser and a stirrer was charged with 100 g. of a polyether having silyl end groups and having a molecular weight of about 8,000, and the temperature was elevated to 130° under nitrogen atmosphere. To the reactor was added dropwise over about 3 hours 50 g. of a liquid consisting of 100 parts of ethyl acrylate, 2 parts of n-dodecylmercaptane and 2 parts of azobisisobutyronitrile. The system became slightly cloudy, but no separation was observed.

To 100 g. of the thus obtained polymer was added 1 g. of a hindered amine antioxidant (commercially available under the commercial name "Sanol LS-770" made by Ciba-Geigy AG.), 1 g. of an ultraviolet absorber (commercially available under the commercial name "Tinuvin 327" made by Ciba-Geigy AG.), 3 g. of tin (II) octylate and 1 g. of laurylamine. After thoroughly admixing, the mixture was poured into a frame having a depth of 3 mm. and cured at 50° C. and 50% RH for 2 days to give a sheet-like cured product. Also, a sheet was prepared in the same manner as above except that the starting polyether used as above was employed as a polymer component. These sheets were then subjected to the weathering test in a sunshine weather-o-meter. The sheet prepared from the polyether caused cracks on the surface after 360 hours, but the sheet prepared from the polymer according to the present invention did not show any change even after 540 hours.

REFERENCE EXAMPLE 1

A one liter pressure autoclave replaced with nitrogen was charged with 320 g. of a diol type polypropylene oxide having an average molecular weight of 3,200 (commercially available under the commercial name "PP-4000" made by Sanyo Chemical Industries, Ltd.). After adding 40.8 g. of NaOH powder (purity: 98%) to the autoclave, the temperature was elevated to 60° C. and the content was agitated at that temperature for 1 hour. Subsequently, 7.76 g. of bromochloromethane was added to the autoclave, and after agitating at 60° C. for 10 hours, 9.2 g. of allyl chloride was added and the reaction was further continued for 10 hours. The reaction mixture was cooled, taken out and placed in an 8 liter separable flask. After adding 1.5 liters of n-hexane and uniformly admixing, 1.5 liters of a 3% sulfuric acid was added and the mixture was agitated for 1 hour. The reaction mixture was allowed to stand for 1 hour, thereby separating into a transparent hexane layer and an aqueous layer whose pH was below 6. The hexane layer was taken out, and hexane was removed by an evaporator to give a polyether (A1) having allyl ether groups at 94% of the total end groups and having an average molecular weight of 8,000.

REFERENCE EXAMPLE 2

A 0.5 liter pressure autoclave was charged with 300 g. of the polyether (A1) obtained in Reference Example 1. After adding 0.3 g. of a 10% solution of chloroplatinic acid in isopropanol and thoroughly admixing, 4.0 g. of methyldimethoxysilane was added, the temperature was elevated to 90° C. and the reaction was carried out for 4 hours at that temperature with agitation.

From the gas chromatography of the reaction mixture, and the infrared absorption spectrum and elemental analysis of the mixture from which low boiling materials were removed, it was confirmed that silyl groups were introduced to 50% of the total end groups, thus a polyether (A2) having both allyl groups and silyl groups at the polymer ends useful as a component (A) was obtained.

EXAMPLE 3

A mixture of 20 g. of the polyether (A1) obtained in Reference Example 1, 70 g. of 2-ethylhexyl acrylate, 20 g. of butyl acrylate, 5.0 g. of vinyl acetate, 2.0 g. of acrylic acid, 0.8 g. of benzoyl peroxide and 50 g. of ethyl acetate was added to a 300 ml. four necked flask. The polymerization was carried out at 80° C. for 6 hours under a nitrogen atmosphere with stirring to give a transparent solution of a polymer.

The thus obtained polymer solution was applied to a polyester film having a thickness of 25 μm. and dried at 110° C. for 2 minutes to give a pressure sensitive adhesive tape with a transparent adhesive layer of 25 μm. in thickness.

The properties of the pressure sensitive adhesive tape are shown in Table 1 together with the results for a commercially available pressure sensitive natural rubber adhesive tape.

It is observed in Table 1 that the pressure sensitive adhesive tape was well balanced excellent tack (initial tackiness), adhesive strength and cohesive strength.

The tack was measured according to the J. Dow type ball tack measuring method (degree of inclination: 30°).

The adhesive strength was measured with respect to a pressure sensitive adhesive tape adhered to a stainless steel plate by a 180° peeling test according to JIS Z 1522 (rate of tension: 300 mm./minute).

The cohesive strength was estimated with respect to a pressure sensitive adhesive tape adhered to a stainless steel plate by measuring the shear distance after 15 minutes according to JIS Z 1524 (adhesion area: 25 mm.×25 mm., load: 1 kg.).

COMPARATIVE EXAMPLE 1

The procedure of Example 3 was repeated except that the polyether (A1) was not employed, to give a pressure sensitive adhesive tape.

The results are shown in Table 1.

TABLE 1

|  | Ex. 3 | Com. Ex. 1 | Natural rubber adhesive |
|---|---|---|---|
| Tack (ball No.) |  |  |  |
| at 5° C. | 10 | 2 | 12 |
| at 23° C. | 20 | 12 | 20 |
| Adhesive strength (g/cm) |  |  |  |
| at 0° C. | 510 | 510 | 490 |
| at 23° C. | 460 | 420 | 360 |
| Cohesive strength (mm) |  |  |  |
| at 30° C. | 0 | 0 | 0.2 |

TABLE 1-continued

|  | Ex. 3 | Com. Ex. 1 | Natural rubber adhesive |
|---|---|---|---|
| at 60° C. | 0 | 0 | falling down 1 min. after |

EXAMPLES 4 TO 7

A four necked flask was charged with 100 g. of the polyether (A2) obtained in Reference Example 2, and after elevating the temperature to 110° C. under a nitrogen atmosphere, a mixture of the acrylate shown in Table 2 and azobisisobutyronitrile was added dropwise in amounts shown in Table 2 to the flask over 2 hours with stirring. The reaction was further continued for 4 hours with stirring to give a transparent viscous liquid polymer. To 100 g. of the thus prepared polymer was added 5 g. of the reaction product of equimolar amounts of dibutyl tin oxide and dioctyl phthalate. After thoroughly admixing, a transparent pressure sensitive adhesive tape was prepared from the mixture in the same manner as in Example 3.

The properties of the pressure sensitive adhesive tape are shown in Table 2.

EXAMPLE 8

A four necked flask was charged with 100 g. of the polyether (A2) obtained in Reference Example 2, and after elevating the temperature to 110° C. under a nitrogen atmosphere, a mixture of 97.5 g. of butyl acrylate, 2.5 g. of trimethoxysilylpropyl acrylate and 4.0 g. of azobisisobutyronitrile was added dropwise to the flask over 2 hours with stirring. The reaction was further continued for 4 hours with stirring to give a transparent viscous liquid polymer. From the thus obtained polymer, a transparent pressure sensitive adhesive tape was prepared in the same manner as in Examples 4 to 7.

The results are shown in Table 2.

COMPARATIVE EXAMPLE 2

The procedure of Example 8 was repeated except that the polyether (A2) was replaced with ethyl acetate. The results are shown in Table 2.

TABLE 2

|  | Ex. 4 | Ex. 5 | Ex. 6 | Ex. 7 | Ex. 8 | Com. Ex. 2 |
|---|---|---|---|---|---|---|
| Polyether of Ref. Ex. 2 (g.) | 100 | 100 | 100 | 100 | 100 | — |
| Acrylate monomer (g.) | | | | | | |
| Ethyl acrylate | 38 | — | — | — | — | — |
| Butyl acrylate | — | 38 | 95 | — | 97.5 | 97.5 |
| 2-Ethylhexyl acrylate | — | — | — | 38 | — | — |
| Trimethoxysilylpropyl acrylate | — | — | — | — | 2.5 | 2.5 |
| Azobisisobutyronitrile (g.) | 2.0 | 2.0 | 4.0 | 2.0 | 4.0 | 4.0 |
| Properties of adhesive | | | | | | |
| Tack at 23° C. (ball No.) | 10 | 17 | 14 | 18 | 15 | 6 |
| Adhesive strength at 23° C. (g./cm) | 30 | 50 | 45 | 45 | 40 | 30 |
| Cohesive strength (mm) | | | | | | |
| at 30° C. | 0 | 0 | 0 | 0 | 0 | 0 |
| at 60° C. | 0 | 0.1 | 0 | 0 | 0 | 0 |

From the results shown in Table 2, it is understood that the pressure sensitive adhesive tapes according to the present invention have excellent tack and cohesive strength.

Also, the pressure sensitive adhesive tapes according to the present invention were adhered to stainless steel plates, and were allowed to stand at 70° C. for 72 hours or exposed in a sunshine weather-o-meter for 200 hours. Change in adhesive strength was scarcely observed, and also the adhesive transfer to the adherend and corrosion of the adherend were not observed at all and, accordingly, it would be understood that the pressure sensitive adhesives according to the present invention are also useful as those for surface protection and masking.

In addition to the ingredients used in the Examples, other ingredients can be used in the Examples as set forth in the specification to obtain substantially the same results.

What we claim is:

1. A curable polymer obtained by addition-polymerizing a vinyl monomer in the presence of a polyether having at least one reactive silicon functional group in the molecule on the average, and having a main chain that consists essentially of recurring units of the general formula: —$R^1O$— wherein $R^1$ is a bivalent hydrocarbon group having 1 to 8 carbon atoms with the reactive silicon functional group being a group of the general formula (1):

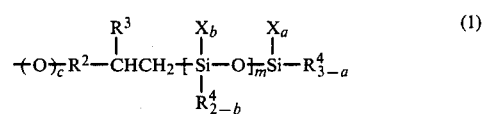

wherein $R^2$ is a bivalent organic group having 1 to 20 carbon atoms, $R^3$ is hydrogen or a monovalent organic group having 1 to 20 carbon atoms, $R^4$ is a monovalent hydrocarbon group or a triorganosiloxy group, a is 0, 1, 2 or 3, b is 0, 1 or 2, c is 0 or 1, provided $1 \leq a+b \leq 4$, X is a silanol group or a hydrolyzable group, and m is 0 or an integer of 1 to 18, and the vinyl monomer comprises at least one member selected from the group consisting of a vinyl monomer of the general formula (6):

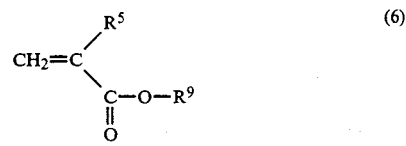

wherein $R^5$ is hydrogen atom, a halogen atom or a monovalent aliphatic hydrocarbon group having 1 to 10 carbon atoms, and $R^9$ is a monovalent hydrocarbon group having 1 to 20 carbon atoms, and a vinyl monomer of the general formula (7):

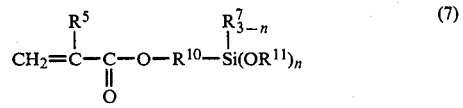

wherein $R^5$ is as defined above, $R^7$ is a monovalent hydrocarbon group having 1 to 10 carbon atoms selected from the group consisting of an alkyl group, an aryl group and aralkyl group, $R^{10}$ is a bivalent hydrocarbon group having 1 to 10 carbon atoms, $R^{11}$ is a monovalent hydrocarbon group having 1 to 8 carbon atoms, and n is an integer of 1 to 3.

2. The polymer of claim 1, wherein said polyether has the reactive silicon functional group at the polymer end and has a molecular weight of 500 to 30,000.

3. A pressure sensitive adhesive composition comprising a curable polymer obtained by addition-polymerizing a vinyl monomer in the presence of either (A) a polyether having at least one reactive silicon functional group in the molecule on the average or a mixture of (A) and (B) a polyether having at least one olefin group in the molecule on the average, wherein the main chain of the polyether (A) and (B) consists essentially of recurring units of the general formula: —$R^1O$— wherein $R^1$ is a bivalent hydrocarbon group having 1 to 8 carbon atoms with the reactive silicon functional group being the group of the general formula (1):

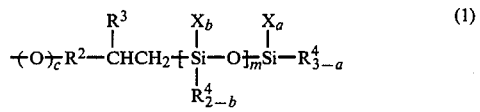

wherein $R^2$ is a bivalent organic group having 1 to 20 carbon atoms, $R^3$ is hydrogen or a monovalent organic group having 1 to 20 carbon atoms, $R^4$ is a monovalent hydrocarbon group or a triorganosiloxy group, a is 0, 1, 2 or 3, b is 0, 1 or 2, c is 0 or 1, provided $1 \leq a+b \leq 4$, X is a silanol group or a hydrolyzable group, and m is 0 or an integer of 1 to 18, and the vinyl monomer comprises at least one member selected from the group consisting of a vinyl monomer of the general formula (6):

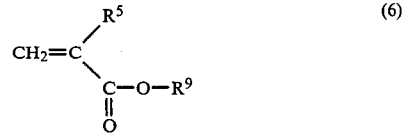

wherein $R^5$ is hydrogen atom, a halogen atom or a monovalent aliphatic hydrocarbon group having 1 to 10 carbon atoms, and $R^9$ is a monovalent hydrocarbon group having 1 to 20 carbon atoms, and a vinyl monomer of the general formula (7):

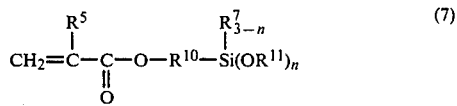

wherein $R^5$ is as defined above, $R^7$ is a monovalent hydrocarbon group having 1 to 10 carbon atoms selected from the group consisting of an alkyl group, an aryl group and an aralkyl group, $R^{10}$ is a bivalent hydrocarbon group having 1 to 10 carbon atoms, $R^{11}$ is a monovalent hydrocarbon group having 1 to 8 carbon atoms, and n is an integer of 1 to 3.

4. The composition of claim 3, wherein said polyether has the reactive silicon functional group at the polymer end and has a molecular weight of 500 to 30,000.

5. The composition of claim 3, wherein said polyether (B) contains a functional group capable of cross-linking.

6. The composition of claim 3, wherein said polyether has both the reactive silicon functional group and the olefin group.

7. The composition of claim 3, wherein said vinyl monomer is a monomer mixture containing at least 50% by mole of an alkyl acrylate with a $C_2$ to $C_{14}$ alkyl group.

8. The composition of claim 3, comprising a moisture-curable polymer obtained by the addition-polymerization of the vinyl monomer in the presence of the polyether (A) having at least one reactive silicon functional group in the molecule on the average.

9. The composition of claim 3, wherein said vinyl monomer is a monomer mixture of a vinyl monomer of the general formula (6) and 0.1 to 10% by mole of a vinyl monomer of the general formula (7).

* * * * *